United States Patent [19]
Weiss

[11] 3,941,707
[45] Mar. 2, 1976

[54] METHOD OF PRODUCING AN INSULATING MATERIAL FOR COATING CATHODE HEATER ELEMENTS

[75] Inventor: Eberhard Weiss, Stuttgart, Germany

[73] Assignee: International Standard Electric Corporation, New York, N.Y.

[22] Filed: Nov. 23, 1973

[21] Appl. No.: 418,642

[30] Foreign Application Priority Data

Apr. 6, 1973 Germany ............................ 2317445

[52] U.S. Cl. ...................... 252/62; 29/611; 75/68 R; 75/138; 75/176; 174/137 B; 423/114; 423/411; 423/600; 423/606; 423/625

[51] Int. Cl.² C01F 7/02; C01G 41/00; C04B 43/00

[58] Field of Search ...... 252/62; 423/114, 411, 600, 423/606, 625, 629; 75/68 R, 138, 176; 29/611; 174/137 B

[56] References Cited

UNITED STATES PATENTS

| | | | |
|---|---|---|---|
| 914,187 | 3/1909 | Rinman | 423/114 |
| 1,752,599 | 4/1930 | Kjellgren | 423/114 X |
| 3,121,035 | 2/1964 | Heinze | 174/137 B |
| 3,396,112 | 8/1968 | Burrows | 252/62 |
| 3,497,455 | 2/1970 | Ahr | 252/62 |
| 3,839,181 | 10/1974 | Degueldre et al. | 423/600 X |

*Primary Examiner*—Harold Ansher
*Attorney, Agent, or Firm*—John T. O'Halloran; Menotti J. Lombardi, Jr.

[57] ABSTRACT

A method of producing an aluminum oxide and tungstate powder for insulating cathode heaters includes mixing a finely divided aluminum oxide powder with ammonium tungstate, rinsing out excess ammonium tungstate, drying the mixture and heating in a nitrogen-hydrogen atmosphere to about 700°C.

5 Claims, No Drawings

METHOD OF PRODUCING AN INSULATING MATERIAL FOR COATING CATHODE HEATER ELEMENTS

BACKGROUND OF THE INVENTION

1. Field of the Invention

The present invention relates to a method of producing an insulating material for coating the heater elements of indirectly heated cathodes.

2. Description of the Prior Art

The use of aluminum oxide as an insulating material for coating cathode heater elements is known. The aluminum oxide is applied to the filament in the form of a fine powder either mechanically with a spray nozzle or electrophoretically in a coating bath. It then forms a white, highly insulating layer. The white color of the layer of aluminum oxide presents a high thermal resistance since the transfer of heat is effected primarily by way of heat conduction and only slight heat radiation takes place. Prior attempts have been made to overcome this disadvantage of the aluminum oxide by coating the insulating layer with a second darker layer. Up to now it was not considered feasible to employ a dark coloring throughout because the desired heating effect could not be achieved while also maintaining both the desired electrical insulation property and long service lifetime. The present improved method is used for making materials for coating cathode heater elements such as described in copending U.S. Application Ser. No. 418,644, filed Nov. 23, 1973, now U.S. Pat. No. 3,895,249, and assigned to the same assignee as the instant application.

SUMMARY OF THE INVENTION

It is therefore the object of the present invention to provide an insulating material which has the advantages of pure aluminum oxide with improved thermal properties. This is accomplished by employing a novel method of manufacturing including mixing a finely divided premixed aluminum oxide powder with a tungstate salt, rinsing the mixture with a suitable liquid such as methanol, drying the mixture, and heating the mixture in a nitrogen and hydrogen atmosphere to a temperature of about 700°C. When using the insulating material in an electrophoretic coating bath it has proven particularly favorable for the mixture to contain a tungstate salt, of approximately 30% by weight of the amount of aluminum oxide. With this material and method, the cathode filaments are coated in an electrophoretic coating bath which provides a precipitated layer of insulating material having a desired porosity.

DESCRIPTION OF THE PREFERRED EMBODIMENT

The method of manufacturing may be carried out as follows:

Very finely divided aluminum oxide is very thoroughly and carefully premixed and stirred with ammonium tungstate which is in the liquid state. This is followed by a rinsing process with a suitable liquid, such as methanol, which rinses out excessive ammonium tungstate. The resulting compound is then dried. Thereafter, the dried compound is placed in an oven having a nitrogen and hydrogen atmosphere and is heated to about 700°C for a suitable time. This produces an insulating material of aluminum oxide and a tungstate salt in the form of a fine powder which may be used for the actual coating process in an electrophoretic bath. A desired mixture for the bath contains a tungstate salt, of about 30% by weight of the amount of aluminum oxide.

What is Claimed is:

1. A method of producing an electrical insulating material for coating cathode heater elements including mixing a finely divided aluminum oxide powder and ammonium tungstate, rinsing the mixture with a liquid, drying the resultant mixture, and heating the mixture in a nitrogen and hydrogen atmosphere to provide a fine powder of aluminum oxide and ammonium tungstate.

2. The method of claim 1 wherein said mixture contains ammonium tungstate of about 30% by weight of the amount of aluminum oxide.

3. The method of claim 2 wherein said ammonium tungstate is in the form of a liquid into which said aluminum oxide powder is stirred, said rinsing liquid removing excess ammonium tungstate.

4. The method of claim 3 wherein said rinsing liquid is methanol.

5. The method of claim 1 wherein said mixture is heated to a temperature of about 700°C.

* * * * *